US012794304B2

(12) United States Patent
Suzuki et al.

(10) Patent No.: US 12,794,304 B2
(45) Date of Patent: Nov. 10, 2026

(54) MOTOR BEARING SYSTEM

(71) Applicant: Mazda Motor Corporation, Hiroshima (JP)

(72) Inventors: Runa Suzuki, Hiroshima (JP); Yuma Miyauchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 286 days.

(21) Appl. No.: 18/613,171

(22) Filed: Mar. 22, 2024

(65) Prior Publication Data

US 2024/0322636 A1 Sep. 26, 2024

(30) Foreign Application Priority Data

Mar. 23, 2023 (JP) ................................ 2023-046469

(51) Int. Cl.
*H02K 5/167* (2006.01)
*F16C 21/00* (2006.01)
(Continued)

(52) U.S. Cl.
CPC .......... *H02K 5/1672* (2013.01); *F16C 21/00* (2013.01); *F16C 32/0614* (2013.01);
(Continued)

(58) Field of Classification Search
CPC .... H02K 5/1732; H02K 5/1672; H02K 11/21; H02K 11/30; F16C 21/00; F16C 32/0614;
(Continued)

(56) References Cited

U.S. PATENT DOCUMENTS 9,435,347 B2 * 9/2016 Danguy ................ F04D 29/049
9,534,629 B1 * 1/2017 Lucas ................ F16C 32/0614
(Continued)

FOREIGN PATENT DOCUMENTS

JP S49-89549 U 8/1974
JP 2009-019728 A 1/2009
WO 2017/149820 A1 9/2017

OTHER PUBLICATIONS

Office Action issued May 26, 2026 in Japanese Patent Application No. 2023-046469, 10 pages.

*Primary Examiner* — Maged M Almawri
(74) *Attorney, Agent, or Firm* — XSENSUS LLP

(57) ABSTRACT

A motor bearing system has: a slide bearing operable as a gas-lubricated bearing by a pump; a rolling bearing; a switching mechanism switching between the slide bearing and the rolling bearing; and a controller. The controller sets the switching mechanism to make the rolling bearing function when a motor rotation speed is lower than a first speed, and sets the switching mechanism to make the slide bearing function and controls the pump, so as to operate the slide bearing as a gas-lubricated bearing when the pump is normal and the motor rotation speed is equal to or higher than the first speed. In the case where the pump is abnormal, the controller sets the switching mechanism to make the rolling bearing function, and restricts the motor rotation speed to be lower than a predetermined speed even when the motor rotation speed is equal to or higher than the first speed.

8 Claims, 9 Drawing Sheets

(51) Int. Cl.
*F16C 32/06* (2006.01)
*H02K 5/173* (2006.01)

(52) U.S. Cl.
CPC ....... *F16C 32/0685* (2013.01); *H02K 5/1732* (2013.01); *F16C 2380/26* (2013.01)

(58) Field of Classification Search
CPC .. F16C 32/0685; F16C 2380/26; F16C 19/52; F16C 19/06; F16C 19/163; F16C 19/547; F16C 2233/00; F16C 2360/00; B60K 1/00; F04B 49/06; F04B 49/02
USPC ............................................................ 310/90
See application file for complete search history.

(56) References Cited

U.S. PATENT DOCUMENTS

| | | | | |
|---|---|---|---|---|
| 11,339,794 | B2 * | 5/2022 | Uneura | F04D 13/12 |
| 11,988,219 | B2 * | 5/2024 | Kuga | F02K 9/46 |
| 2018/0073557 | A1 * | 3/2018 | Hwang | F16C 19/02 |
| 2023/0039432 | A1 * | 2/2023 | Abdul | H02K 5/1732 |

* cited by examiner

MOTOR BEARING SYSTEM

CROSS-REFERENCE TO RELATED APPLICATION

The present application claims priority to Japanese Patent Application 2023-046469, filed Mar. 23, 2023, the entire contents of which are incorporated herein by reference.

BACKGROUND

Field

The present disclosure relates to a motor bearing system.

Description of the Related Art

A rolling bearing and a slide bearing have been used as bearings, each of which supports a rotary shaft of a power source (an engine or a motor) or the like of a vehicle, for example. While the rolling bearing has low friction in a low-speed range, the slide bearing has high friction in the low-speed range. Meanwhile, while the rolling bearing has a finite life due to rolling contact fatigue, the slide bearing has an infinite life under an appropriate lubrication condition.

Here, the following technique has been proposed. A system having both of the rolling bearing and the slide bearing is configured to switch the applied bearing according to characteristics of each of the bearings as described above. For example, a system using the rolling bearing and the slide bearing as the bearing that supports a crankshaft or a camshaft of the engine is disclosed in Patent Literature 1. In such a system, only the rolling bearing functions at a start at a low rotational frequency, and only the slide bearing functions after this start.

CITATION LIST

Patent Literature

[Patent Literature 1] JP2009-19728A

SUMMARY

As described above, in the engine, application of the slide bearing is effective in a high-speed range. Fluid lubrication with lubricating oil is generally used for this slide bearing. By the way, the motor that is operated at the higher speed than the engine has such a problem that, when such a slide bearing is applied in the high-speed range of the motor, fluid friction and resistance of the lubricating oil are increased, which worsens electric efficiency of the motor.

In order to solve such a problem, the present inventor has considered to apply a gas-lubricated bearing (for example, an air bearing), for which lubrication (gaseous lubrication) with gas having lower viscosity than the lubricating oil is used, as the slide bearing. In order to realize such a gas-lubricated bearing, a gas layer has to be reliably formed between the bearing and the rotary shaft in order to prevent contact therebetween. It is considered that a so-called wedge effect and a so-called restriction effect are preferably used to form this gas layer. However, the wedge effect and the restriction effect can only basically be exerted in the high-speed range. Thus, in a method using these effects, the bearing and the rotary shaft possibly contact each other in the low-speed range.

In view of the above, in order to reliably form the gas layer for the gas-lubricated bearing in the low-speed range, the present inventor has considered to apply a static pressure to the bearing by a pump. However, since electricity consumption by the pump worsens the electric efficiency, it is desired to minimize actuation of the pump. Here, the gas layer is formed according to a combination of the static pressure, which is applied by the pump, and a pressure generated by the wedge effect and the restriction effect described above. These effects are determined by the viscosity of the gas, a sliding speed, and the pressure. In addition, degrees of occurrence of these effects can be comprehended from the motor rotation speed (uniquely, the rotational frequency; hereinafter the same).

From an experiment performed by the present inventor, it is found that, since the wedge effect and the restriction effect cannot be exerted in the low-speed range of the motor, an electric efficiency improvement allowance obtained by applying the gas-lubricated bearing is smaller than an electric efficiency reduction allowance obtained by actuating the pump to realize the gas-lubricated bearing, and thus the gas-lubricated bearing should not be applied. Accordingly, the present inventor considered to apply the gas-lubricated bearing by actuating the pump only in the higher speed range than this low-speed range and to apply the rolling bearing in the low-speed range.

By the way, in the case where the pump as described above becomes abnormal, it is difficult to realize the gas-lubricated bearing. Thus, it can be said that it is desired to apply the rolling bearing even in the higher speed range than the low-speed range. However, in the case where such a rolling bearing is applied, deformation of a rolling element, an increase in resistance, and the like possibly occur in the rolling bearing when the motor is driven at the extremely high rotational frequency. Based on such findings, the present inventor has conceived of executing control related to the bearing in order to handle the abnormality of the pump, and has completed the disclosure.

The disclosure has been made on the basis of the findings as described so far and therefore has a purpose of precisely executing control related to a bearing in order to handle abnormality of a pump in a motor bearing system that has the bearing operable as a gas-lubricated bearing with gas supplied from the pump.

Solution to Problem

In order to achieve the above purpose, the disclosure is a motor bearing system and has: a rolling bearing that supports a rotary shaft of a motor; a slide bearing that is arranged in parallel with the rolling bearing on an axis of the rotary shaft to support the rotary shaft, the slide bearing being operable as a gas-lubricated bearing that achieves gaseous lubrication with gas supplied to the slide bearing; a pump that supplies the gas to the slide bearing; a switching mechanism capable of setting one of a first state where the rolling bearing functions as a bearing that supports the rotary shaft and a second state where the slide bearing functions as the bearing that supports the rotary shaft; a detector that detects a rotation speed of the motor; and a controller that controls the pump and the switching mechanism on the basis of the rotation speed detected by the detector and determines whether the pump is normal or abnormal. The controller: sets the switching mechanism into the first state when the rotation speed is lower than a threshold value; sets the switching mechanism into the second state and controls the pump, so as to operate the slide bearing as the gas-lubricated bearing when the controller determines that the pump is normal and when the rotation speed is equal to or higher than the threshold value; and sets the switching mechanism into the first state and controls the motor to restrict the rotation speed of the motor to be lower than a predetermined speed even when the rotation speed is equal to or higher than the threshold value in the case where the controller determines that the pump is abnormal.

In the disclosure that is configured as described above, the controller comprehends magnitudes of exertion of a wedge effect and a restriction effect from the motor rotation speed and executes the control related to the bearing. The motor rotation speed precisely reflects the magnitudes of the exertion of the wedge effect and the restriction effect. Thus, according to the disclosure, this control can be executed accurately with the simple configuration.

More specifically, in the disclosure, when the motor rotation speed is lower than the threshold value, the wedge effect and the restriction effect are hardly exerted. For this reason, electricity consumption by the pump that is required to operate the slide bearing as the gas-lubricated bearing becomes extremely large. Thus, the controller does not apply the slide bearing but applies the rolling bearing as the bearing that functions to support the rotary shaft. In this way, it is possible to suppress worsening of the electric efficiency, which is caused by actuating the pump to realize the gas-lubricated bearing.

In the disclosure, when the motor rotation speed is equal to or higher than the threshold value, the wedge effect and the restriction effect can be exerted. Accordingly, the electricity consumption by the pump that is required to operate the slide bearing as the gas-lubricated bearing becomes relatively small. Thus, the controller applies the slide bearing as the bearing that functions to support the rotary shaft. In this case, an electric efficiency improvement allowance, which is obtained by applying the slide bearing as the gas-lubricated bearing, becomes larger than an electric efficiency reduction allowance, which is obtained by actuating the pump to realize the gas-lubricated bearing. Thus, it is possible to ensure an electric efficiency improvement effect, which is exerted by applying the gas-lubricated bearing.

In the disclosure, in the case where the pump is abnormal, the controller applies the rolling bearing as the bearing that functions to support the rotary shaft even when the motor rotation speed is equal to or higher than the threshold value. Accordingly, in the case where the slide bearing is applied to be operated as the gas-lubricated bearing, it is possible to avoid a contact risk of the slide bearing with the rotary shaft. Furthermore, when the pump is abnormal, the controller restricts the motor rotation speed to be lower than the predetermined speed. Thus, it is possible to suppress occurrence of deformation of a rolling element, a significant increase in resistance, and the like in the rolling bearing, which is caused by driving the motor at the high rotation speed.

From another perspective, in order to achieve the above purpose, the disclosure is a motor bearing system and has: a bearing that includes plural rolling elements and supports a rotary shaft of a motor, the bearing being operated as a rolling bearing or being operated as a gas-lubricated bearing that achieves gaseous lubrication with gas supplied to the bearing; a pump that supplies the gas to the bearing; a detector that detects a rotation speed of the motor; and a controller that controls the pump on the basis of the rotation speed detected by the detector and determines whether the pump is normal or abnormal. The controller: stops the pump or reduces a driving force of the pump to be smaller than that at the time when the rotation speed is equal to or higher than a threshold value, so as to operate the bearing as the rolling bearing in the case where the rotation speed is lower than the threshold value; controls the pump to operate the bearing as the gas-lubricated bearing when the controller determines that the pump is normal, and when the rotation speed is equal to or higher than the threshold value; and operates the bearing as the rolling bearing and controls the motor to restrict the rotation speed of the motor to be lower thana predetermined speed even when the rotation speed is equal to or higher than the threshold value in the case where the controller determines that the pump is abnormal.

Also, by the disclosure that is configured as described above, it is possible to precisely execute control related to the bearing so as to handle abnormality of the pump. In particular, in the disclosure described above, the single bearing is selectively operated as the rolling bearing or the gas-lubricated bearing. Thus, it is possible to execute the control related to the bearing with the simple configuration.

In the disclosure, preferably, the rolling bearing has an outer ring, an inner ring, and a rolling element provided therebetween. In order to switch between the first state and the second state, the switching mechanism can move a part of the rolling bearing, so as to switch between a state where (i) the outer ring and the inner ring and (ii) the rolling element are in contact with each other in the rolling bearing and a state where the outer ring or the inner ring is not in contact with the rolling element in the rolling bearing.

According to the disclosure that is configured as described above, it is possible to appropriately switch the bearing, which functions to support the rotary shaft of the motor, between the rolling bearing and the slide bearing by using the switching mechanism.

In the disclosure, preferably, the controller sets the threshold value on the basis of the rotation speed of the motor at which a required pressure of the pump to operate the slide bearing as the gas-lubricated bearing can be obtained.

According to the disclosure that is configured as described above, even in the case where the pump pressure is reduced, it is possible to precisely realize the gas-lubricated bearing by this slide bearing when the rolling bearing is switched to the slide bearing by using the threshold value that corresponds to such a pump pressure.

In the disclosure, preferably, in the case where the set threshold value is equal to or higher than the predetermined speed, the controller sets the switching mechanism into the first state even when the rotation speed is equal to or higher than the threshold value.

According to the disclosure that is configured as described above, it is possible to suppress the deformation of the rolling element, the significant increase in the resistance, and the like in the rolling bearing, which occur when the motor rotation speed becomes equal to or higher than the predetermined speed at a stage prior to switching of the bearing that functions to support the rotary shaft from the rolling bearing to the slide bearing.

In the disclosure, preferably, the controller sets the threshold value on the basis of the rotation speed of the motor at which a required pressure of the pump to operate the bearing as the gas-lubricated bearing can be obtained.

According to the disclosure that is configured as described above, even in the case where the pump pressure is reduced, it is possible to precisely realize this gas-lubricated bearing when the rolling bearing is switched to the gas-lubricated bearing by using the threshold value that corresponds to such a pump pressure.

In the disclosure, preferably, in the case where the set threshold value is equal to or higher than the predetermined speed, the controller operates the bearing as the rolling bearing even when the rotation speed is equal to or higher than the threshold value.

According to the disclosure that is configured as described above, it is possible to suppress the deformation of the rolling element, the significant increase in the resistance, and the like in the bearing, which occur when the motor rotation speed becomes equal to or higher than the predetermined speed at a stage prior to switching from the rolling bearing to the gas-lubricated bearing.

In the disclosure, preferably, the controller sets the threshold value on the basis of a radial load that is applied to the rotary shaft.

According to the disclosure that is configured as described above, when the radial load (uniquely corresponds to radial acceleration) that is applied to the rotary shaft is large, it is possible to avoid the contact risk of the bearing with the rotary shaft and to thereby ensure safety and reliability.

Advantages

According to the disclosure, it is possible to precisely execute the control related to the bearing, so as to handle abnormality of the pump in the motor bearing system that has the bearing operable as the gas-lubricated bearing with the gas supplied from the pump.

BRIEF DESCRIPTION OF THE DRAWINGS

The scope of the present disclosure is best understood from the following detailed description of exemplary embodiments when read in conjunction with the accompanying drawings.

DETAILED DESCRIPTION

A description will hereinafter be made on a motor bearing system according to embodiments of the disclosure with reference to the accompanying drawings.

First Embodiment

Figure 1:
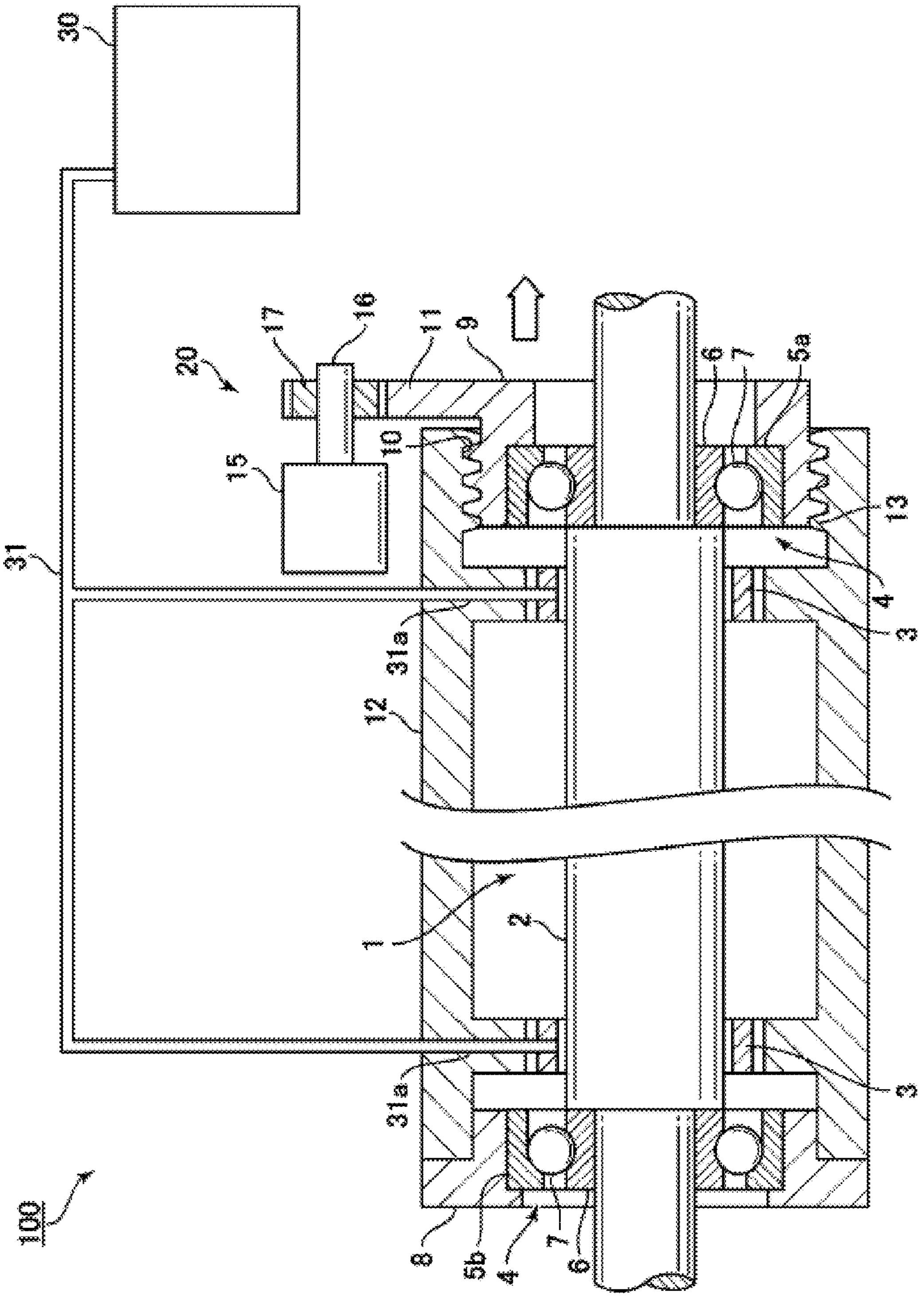
FIG. 1 is a schematic configuration view of a motor bearing system according to a first embodiment of the disclosure.
Figure 2:
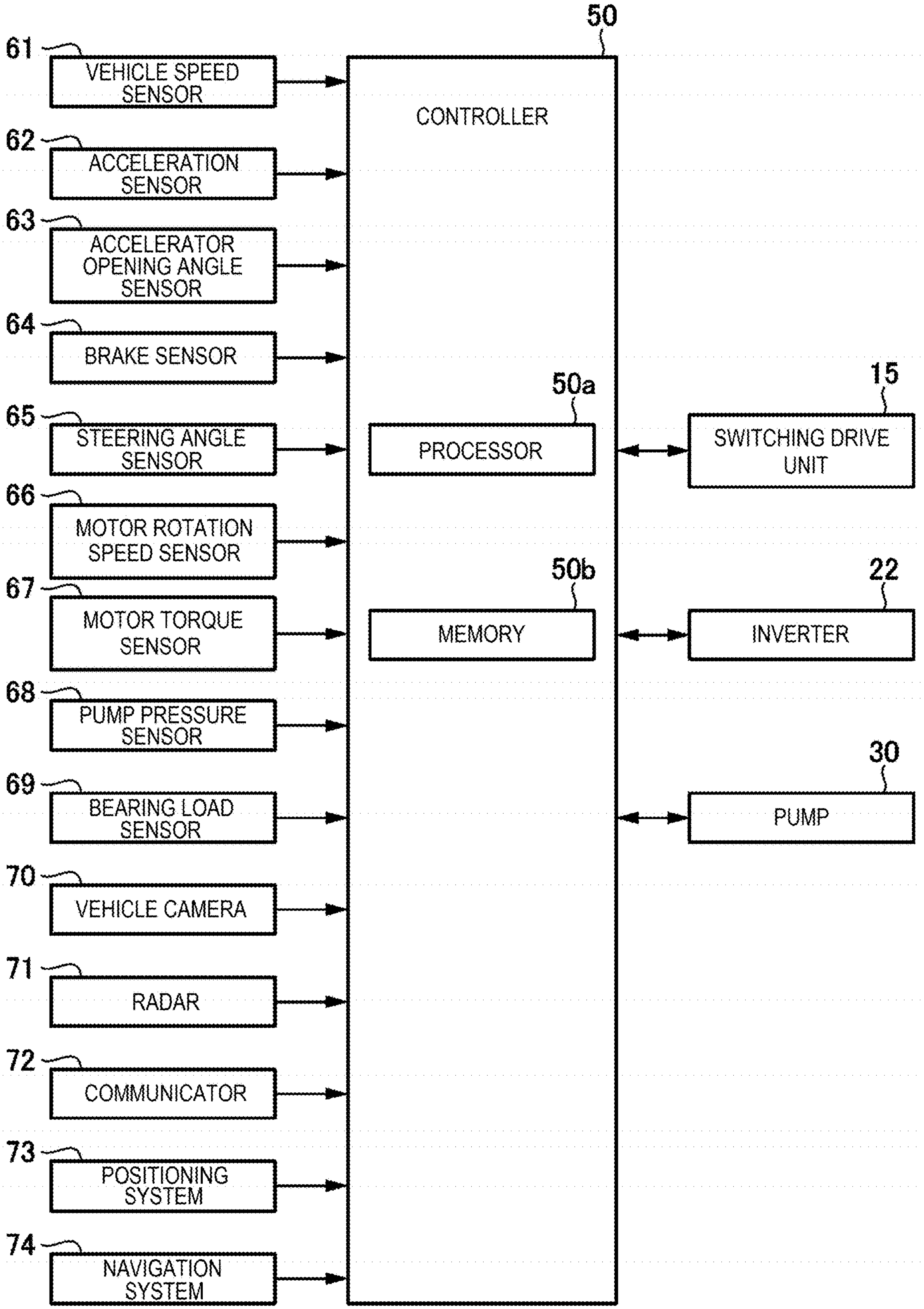
FIG. 2 is a block diagram illustrating an electric configuration of the motor bearing system according to the first embodiment of the disclosure.

A description will herein be made on a first embodiment of the disclosure. First, a description will be made on a configuration of a motor bearing system according to the first embodiment with reference to FIGS. 1 and 2. FIG. 1 is a schematic configuration view of the motor bearing system according to the first embodiment. FIG. 2 is a block diagram illustrating an electric configuration of the motor bearing system according to the first embodiment.

As illustrated in FIG. 1, a motor bearing system 100 is mounted to a vehicle and mainly has: a motor 1 that drives the vehicle; a rotary shaft 2 of the motor 1; a pair of slide bearings 3 that supports the rotary shaft 2; a pair of rolling bearings 4 that is arranged in parallel with the slide bearings 3 on an axis of the rotary shaft 2 and supports the rotary shaft 2; and a housing 12 that accommodates the motor 1, rotary shaft 2, slide bearings 3, and rolling bearings 4.

The rolling bearings 4 are angular ball bearings, for example, and respectively have: outer rings 5*a*, 5*b*; inner rings 6 that are attached to the rotary shaft 2; and plural rolling elements (balls and rollers) 7 that are interposed between the inner ring 6 and respective one of these outer rings 5*a*, 5*b*. The outer ring 5*b* of the rolling bearing 4 on a left end side of the rotary shaft 2 is attached to an inner circumferential side of a cylindrical outer ring fixture member 8 while the outer ring 5*a* of the rolling bearing 4 on a right end side of the rotary shaft 2 is attached to an inner circumferential side of a cylindrical outer ring movable member 9. The latter outer ring movable member 9 has a thread groove 10 on an outer circumference at one end and has a fan-shaped gear 11 on the outer circumference at the other end.

The thread groove 10 of the outer ring movable member 9, to which the outer ring 5*a* is attached, is threaded onto a thread groove 13 that is formed on an inner circumference at a right end of the housing 12. The outer ring fixture member 8, to which the outer ring 5*b* is attached, is fixed to a left end of the housing 12. A switching drive unit 15 that has a motor and a decelerator therein is provided on an outer circumference on the right end side of such a housing 12. This switching drive unit 15 has a drive shaft 16 and a drive gear 17 fixed to this drive shaft 16, and this drive gear 17 meshes with the fan-shaped gear 11 of the outer ring movable member 9.

The motor bearing system 100 further has a pump 30 that supplies gas (typically air but may be oil gas or a refrigerant) to the slide bearing 3 in order to form a gas layer between the rotary shaft 2 and the slide bearing 3 and thereby achieve gaseous lubrication of the slide bearing 3, that is, to cause the slide bearing 3 to float off the rotary shaft 2 and be operated as a gas-lubricated bearing. More specifically, the pump 30 supplies the gas through a gas supply passage 31 to a clearance (a radial clearance that is defined in a radial direction of the rotary shaft 2) between the rotary shaft 2 and each of the paired slide bearings 3. In this gas supply passage 31, a downstream portion 31*a* that is connected to the slide bearing 3 is formed in the housing 12 and each of the slide bearings 3. In this way, for example, each of the slide bearings 3 can float between an outer circumferential surface of the rotary shaft 2 and an inner circumferential surface of the housing 12 that surrounds the rotary shaft 2 and the slide bearings 3.

The outer ring movable member 9 (including the thread groove 10 and the fan-shaped gear 11), the thread groove 13 of the housing 12, and the switching drive unit 15 (including the drive shaft 16 and the drive gear 17) described above constitute a switching mechanism 20 that switches the bearing, which functions to support the rotary shaft 2, between the rolling bearing 4 and the slide bearing 3.

A description will herein be made on bearing switching operation by the switching mechanism 20. First, in a basic state of the rolling bearing 4 where the rolling element 7 is in contact with respective one of the outer rings 5*a*, 5*b* and the inner ring 6, the rolling bearing 4 functions as the bearing that supports the rotary shaft 2. In this state, the radial clearance is generated between the slide bearing 3 and the rotary shaft 2, and the slide bearing 3 does not contact the rotary shaft 2. Thus, the slide bearing 3 does not function as the bearing that supports the rotary shaft 2. In summary, the above-described state corresponds to a state (a first state) where the rolling bearing 4 functions as the bearing supporting the rotary shaft 2 and the slide bearing 3 does not function as the bearing supporting the rotary shaft 2.

Next, when the switching drive unit 15 of the switching mechanism 20 causes the drive gear 17 to rotate via the drive shaft 16, the fan-shaped gear 11 that meshes with the drive gear 17 rotates, and the thread groove 10 coupled to this fan-shaped gear 11 also rotates. Consequently, the thread groove 10 moves rightward in FIG. 1 in an axial direction along the thread groove 13 of the housing 12. In this way, the entire outer ring movable member 9, which has the thread groove 10 and the fan-shaped gear 11, moves rightward. As a result, the outer ring 5*a* also moves rightward, and thus the outer ring 5*a* separates from the rolling element 7 (that is, no longer in contact therewith). In addition, when the outer ring 5*a* (the outer ring 5*a* of the rolling bearing 4 on the right end side of the rotary shaft 2) moves, just as described, the rotary shaft 2 also moves rightward. As a result, the inner ring 6 of the rolling bearing 4, which is provided on the left end side of the rotary shaft 2, moves to cause the outer ring 5*b* of the rolling bearing 4 to separate from the rolling element 7 (that is, no longer in contact therewith). When the switching mechanism 20 is operated as described so far, that is, when the switching drive unit 15 of the switching mechanism 20 is driven, the rolling bearing 4 no longer functions as the bearing that supports the rotary shaft 2.

Meanwhile, in a state where the outer rings 5*a*, 5*b* separate from the rolling elements 7 in the rolling bearings 4 as described above, a radial clearance is generated in each of the rolling bearings 4. This radial clearance is larger than the above-described radial clearance between the slide bearing 3 and the rotary shaft 2. Accordingly, the rotary shaft 2 and the like move downward due to own weight and an external load, which allows the rotary shaft 2 to contact the slide bearing 3. As a result, the slide bearing 3 is brought into a state of functioning as the bearing that supports the rotary shaft 2. Basically, in this embodiment, in such a state, the gas is supplied from the pump 30 to form the gas layer between the rotary shaft 2 and the slide bearing 3 as described above. Thus, the slide bearing 3 does not contact the rotary shaft 2. In summary, the state as described so far, that is, the state where the switching drive unit 15 of the switching mechanism 20 is driven corresponds to a state (a second state) where the slide bearing 3 functions as the bearing that supports the rotary shaft 2 and the rolling bearing 4 does not function as the bearing that supports the rotary shaft 2.

In the above example, the gear, the thread groove, and the like are used to cause the outer ring 5*a* to move. However, in another example, a predetermined push-out mechanism may be used to cause the outer ring 5*a* to move. In this example, the push-out mechanism only needs to apply a push-out force to the outer ring 5*a*, which is in an urged state by a spring, and an amount of the push-out force is large enough to overcome an urging force of this spring. In the above example, the outer rings 5*a*, 5*b* separate from the rolling elements 7. However, in another example, instead of the outer rings 5*a*, 5*b*, the inner rings 6 may separate from the rolling elements 7.

Next, as illustrated in FIG. 2, the motor bearing system 100 has: various sensors 61 to 74; a controller 50 that receives various signals from these various sensors; and the above-described switching drive unit 15, the above-described pump 30, and an inverter 22 that are controlled by a control signal supplied from this controller 50. The inverter 22 is connected to the motor 1. The controller 50 is implemented by a computer that includes: one or more processors 50*a* (typically CPUs); and memory 50*b*, such as ROM and RAM, that stores various programs (including a basic control program such as an OS and an application program activated on the OS to implement a particular function) interpretively executed on the processor 50*a* and various types of data.

More specifically, the motor bearing system 100 has: a vehicle speed sensor 61 that detects a speed of the vehicle (a vehicle speed); an acceleration sensor 62 that detects acceleration of the vehicle; an accelerator opening angle sensor 63 that detects an accelerator opening angle corresponding to a depression amount of an accelerator pedal; a brake sensor 64 that detects a depression amount of a brake pedal; a steering angle sensor 65 that detects a rotation angle (a steering angle) of a steering wheel; a motor rotation speed sensor 66 that detects a rotation speed (uniquely a rotational frequency) of the motor 1; a motor torque sensor 67 that detects torque of the motor 1; a pump pressure sensor 68 that detects a pressure of the pump 30; and a bearing load sensor 69 that detects a load (a radial load) applied in the radial direction to each of the slide bearing 3 and the rolling bearing 4. The motor rotation speed sensor 66 corresponds to the “detector” in the disclosure.

Furthermore, the motor bearing system 100 has: a vehicle camera 70 that captures an image of the surroundings of the vehicle; a radar 71 (for example, a millimeter-wave radar) that measures a location and a speed of a target object (another vehicle, a pedestrian, an obstacle, or the like) that exists around the vehicle; a communicator 72 that makes inter-vehicle communication and road-to-vehicle communication; a positioning system 73 that includes a GPS system, a gyroscopic system, or the like to detect a location of the vehicle; and a navigation system 74 that stores map data. Instead of the radar 71, a laser radar, an ultrasonic sensor, or the like may be used.

Figure 3:
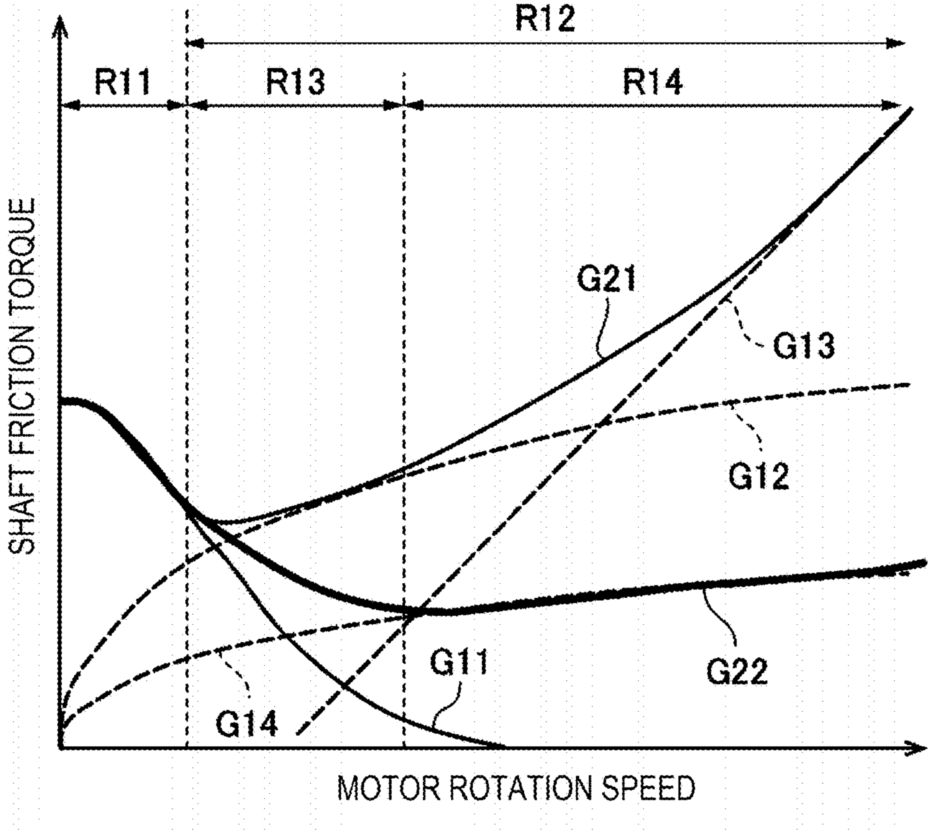
FIG. 3 is a graph for a basic concept of motor bearing control according to the first embodiment of the disclosure.

Next, a description will be made on a basic concept of motor bearing control according to the first embodiment with reference to FIG. 3. A description will herein be made by contrasting the motor bearing control according to the first embodiment with motor bearing control according to a comparative example. In FIG. 3, a horizontal axis represents the motor rotation speed, and a vertical axis represents shaft friction torque.

In the motor bearing control according to the comparative example, the bearing that functions to support the rotary shaft of the motor is switched between the rolling bearing and the slide bearing, for which fluid lubrication with lubricating oil is used. More specifically, in the comparative example, when the motor rotation speed is in a range R11 (hereinafter appropriately referred to as a "low-speed range", the rolling bearing is applied as the bearing that functions to support the rotary shaft 2. Meanwhile, when the motor rotation speed is in a higher range R12 than the low-speed range R11, the slide bearing is applied as the bearing that functions to support the rotary shaft 2. This control corresponds to the technique disclosed in Patent Literature 1.

In FIG. 3, a graph G11 indicates the shaft friction torque that is generated to the rolling bearing, that is, boundary lubrication friction due to direct contact, and a graph G12 indicates the shaft friction torque that is generated the slide bearing, for which the fluid lubrication with the lubricating oil is used, that is, fluid lubrication friction of the lubricating oil. Accordingly, the shaft friction torque that is generated in the motor bearing control according to the comparative example is a sum of the shaft friction torque indicated by the graph G11 and the shaft friction torque indicated by the graph G12, that is, is indicated by a graph G21. In this case, in the range R12, the shaft friction torque is significantly increased as the motor rotation speed is increased. This is because of an increase in the friction due to deformation of the rolling element in the rolling bearing, as indicated by a graph G13.

Meanwhile, in the first embodiment, as described above, the bearing that functions to support the rotary shaft 2 of the motor 1 is switched between the rolling bearing 4 and the slide bearing 3 that is operable as the gas-lubricated bearing with the gas supplied from the pump 30. First, in the low-speed range R11, as described in the section "Technical Problem", the wedge effect and the restriction effect are hardly exerted. Thus, an electric efficiency improvement allowance that can be obtained by applying the slide bearing 3 to be operated as the gas-lubricated bearing becomes smaller than an electric efficiency reduction allowance that is obtained by actuating the pump 30 to realize this gas-lubricated bearing (that is, electricity consumption by the pump 30 is significantly increased). For this reason, in the low-speed range R11, in a stopped state of the pump 30, the controller 50 controls the switching drive unit 15 of the switching mechanism 20 so as to apply the rolling bearing 4 as the bearing that functions to support the rotary shaft 2. In other words, the controller 50 controls the switching drive unit 15 so as not to cause the slide bearing 3 to function but to cause only the rolling bearing 4 to function.

Meanwhile, when such a motor rotation speed exceeds the low-speed range R11, that is, in the higher range R12 than the low-speed range R11, the wedge effect and the restriction effect are exerted to a certain extent. Accordingly, the electric efficiency improvement allowance, which is obtained by applying the slide bearing 3 to be operated as the gas-lubricated bearing, becomes larger than the electric efficiency reduction allowance, which is obtained by actuating the pump 30 to realize this gas-lubricated bearing. Thus, in the range R12, the controller 50 controls the switching drive unit 15 to apply the slide bearing 3 as the bearing that functions to support the rotary shaft 2. In addition, in a range R14, where a sliding speed is extremely high, on a high-speed side in the range R12, the significantly high wedge effect and restriction effect can be exerted. Thus, the gas-lubricated bearing can be realized without applying the static pressure by the pump 30. Accordingly, in the first embodiment, in a range R13 on the low-speed side (hereinafter appropriately referred to as a "middle-speed range") in the range R12 where the slide bearing 3 functions, the controller 50 controls the switching drive unit 15 to cause only the slide bearing 3 to function while actuating the pump 30. Meanwhile, in the range R14 on the high-speed side (hereinafter appropriately referred to as a "high-speed range"), the controller 50 stops the pump 30 and controls the switching drive unit 15 to cause only the slide bearing 3 to function.

In FIG. 3, a graph G14 indicates the shaft friction torque that is generated to the slide bearing 3 operated as the gas-lubricated bearing, that is, the gaseous lubrication friction. Accordingly, the shaft friction torque that is generated in the motor bearing control according to the above first embodiment is a sum of the shaft friction torque indicated by the graph G11 and the shaft friction torque indicated by the graph G14, that is, is indicated by a graph G22. When the shaft friction torque according to the first embodiment, which is indicated by such a graph G22, is compared to the shaft friction torque according to the comparative example, which is indicated by the graph G21, it is understood that the shaft friction torque is significantly reduced in the first embodiment. Thus, it can be said that, according to the first embodiment, the electric efficiency can effectively be improved in comparison with the comparative example.

In the first embodiment, the controller 50 determines whether the pump 30, which is operated as described above, is normal or abnormal. Then, in the case where the controller 50 determines that the pump 30 is abnormal, the controller 50 controls the switching drive unit 15 of the switching mechanism 20, so as to apply the rolling bearing 4 as the bearing that functions to support the rotary shaft 2 even when the motor rotation speed exceeds the low-speed range R11. When the pump 30 is abnormal, it is difficult to form the gas layer between the rotary shaft 2 and the slide bearing 3 with the gas from the pump 30, so as to operate the slide bearing 3 as the gas-lubricated bearing. Thus, in the first embodiment, when the pump 30 is abnormal, the rolling bearing 4 is applied in order to avoid a contact risk of the slide bearing 3, which is operated as the gas-lubricated bearing, with the rotary shaft 2. In addition, in the first embodiment, when the rolling bearing 4 is applied due to such abnormality of the pump 30, the controller 50 controls the motor 1 to restrict the motor rotation speed to be lower than a predetermined speed (hereinafter appropriately described as a "predetermined speed Vlim"). In this way, the deformation of the rolling element 7, the significant increase in the resistance, and the like in the rolling bearing 4, which occur by driving the motor 1 at the high rotation speed, are suppressed.

Figure 4:
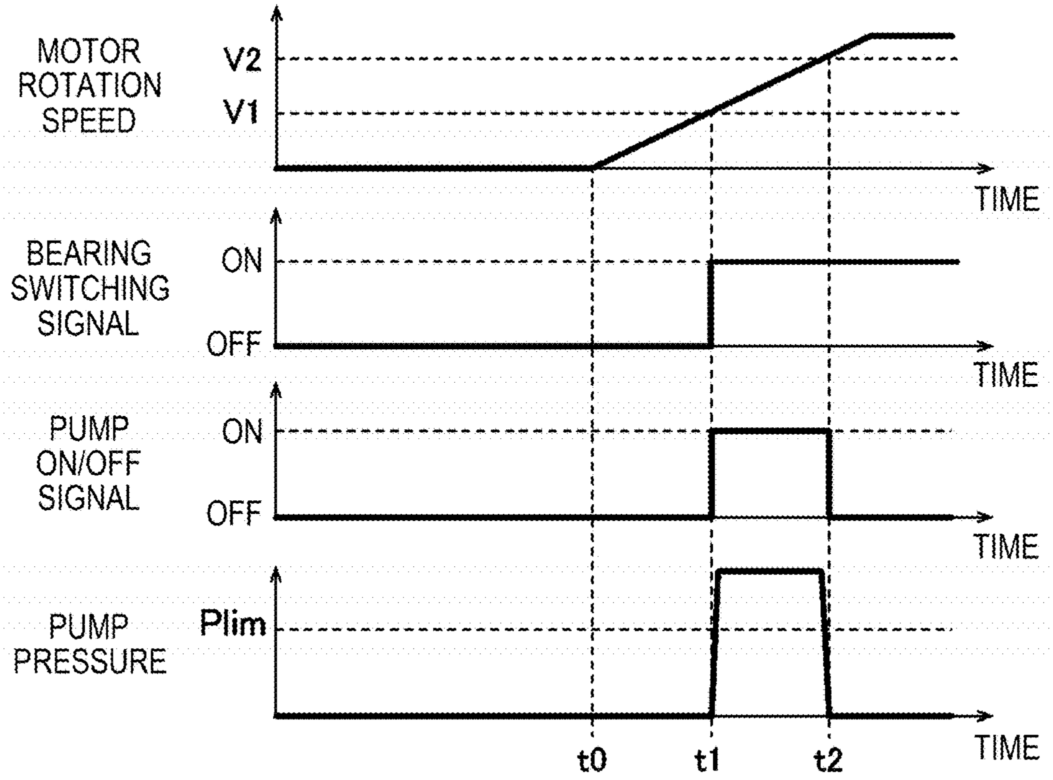
FIG. 4 includes time charts illustrating the motor bearing control according to the first embodiment of the disclosure.

Next, a description will be made on a basic flow of the motor bearing control according to the first embodiment with reference to FIG. 4. FIG. 4 includes time charts illustrating the motor bearing control according to the first embodiment. In FIG. 4, each horizontal axis represents time, and vertical axes sequentially represent, from top, the motor rotation speed detected by the motor rotation speed sensor 66, a signal (hereinafter referred to as a "bearing switching signal") that is supplied to the switching drive unit 15 of the switching mechanism 20, an on/off signal of the pump 30, and a pump pressure detected by the pump pressure sensor 68.

As illustrated in FIG. 4, when the motor 1 is started at time to, in an off state of the pump 30, the controller 50 sets the switching mechanism 20 to cause only the rolling bearing 4 to function (in this case, the bearing switching signal supplied to the switching drive unit 15 is off). Then, at time t1, the motor rotation speed reaches a first speed V1 (corresponding to the "threshold value" in the disclosure) that corresponds to a lower limit value of the middle-speed range R13.

At this time, by turning on the pump 30, the controller 50 determines whether the pump 30 is normal or abnormal. Typically, the controller 50 determines whether the pump 30 is normal or abnormal by determining whether the pump pressure (for example, a maximum pump pressure) detected by the pump pressure sensor 68 is equal to or higher than a predetermined pressure Plim. This predetermined pressure Plim is set on the basis of a minimum value of the pump pressure that is required to form the gas layer between the rotary shaft 2 and the slide bearing 3 with the gas from the pump 30, so as to operate the slide bearing 3 as the gas-lubricated bearing. In the example illustrated in FIG. 4, since the pump pressure detected by the pump pressure sensor 68 is equal to or higher than the predetermined pressure Plim, the controller 50 determines that the pump 30 is normal.

Accordingly, the controller 50 turns on the bearing switching signal that is supplied to the switching drive unit 15, so as to cause only the slide bearing 3 to function, that is, switch the bearing that functions to support the rotary shaft 2 of the motor 1 from the rolling bearing 4 to the slide bearing 3. In addition, the controller 50 controls the pump 30 to form the gas layer between the rotary shaft 2 and the slide bearing 3 with the gas from the pump 30 and thereby operate the slide bearing 3 as the gas-lubricated bearing.

Then, at time t2, the motor rotation speed reaches a second speed V2 that corresponds to a lower limit value of the high-speed range R14. At this time, the controller 50 turns off the pump 30 while turning on the bearing switching signal that is supplied to the switching drive unit 15. This is because, in the high-speed range R14, the sliding speed is extremely high, the significantly high wedge effect and restriction effect can be exerted, and the gas-lubricated bearing can thereby be realized without actuating the pump 30.

Here, in the case where the pump pressure (for example, the maximum pump pressure) detected by the pump pressure sensor 68 is lower than the predetermined pressure Plim, the controller 50 determines that the pump 30 is abnormal. In this case, the controller 50 does not switch the bearing that functions to support the rotary shaft 2 of the motor 1 from the rolling bearing 4 to the slide bearing 3, and continues to apply the rolling bearing 4 (keeps the bearing switching signal to be off). In addition, the controller 50 controls the motor 1 to restrict the motor rotation speed to be lower than the predetermined speed Vlim.

Figure 5:
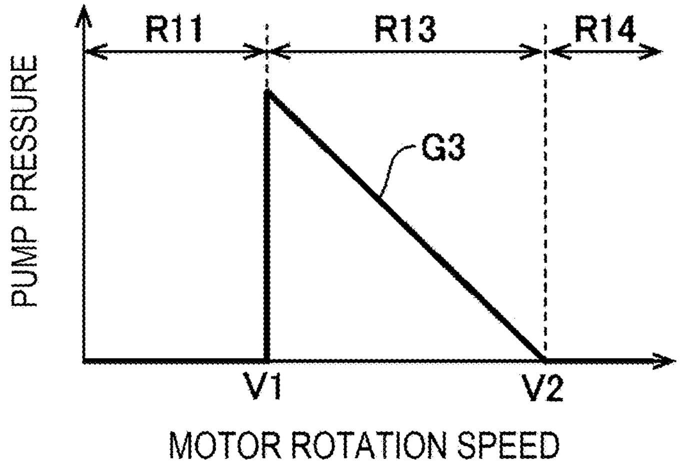
FIG. 5 is a graph for a basic control method according to the first embodiment of the disclosure.

Next, a specific description will be made on the motor bearing control according to the first embodiment with reference to FIGS. 5 to 7. First, FIG. 5 is a graph for a basic control method of the pump 30, which is executed when the pump 30 is normal, in the first embodiment. In FIG. 5, a horizontal axis represents the motor rotation speed, and a vertical axis represents the pump pressure. As described above, the controller 50 actuates the pump 30 to generate the pump pressure only when the motor rotation speed is equal to or higher than the first speed V1 and lower than the second speed V2 (that is, in the middle-speed range R13).

More specifically, in the middle-speed range R13, the controller 50 controls the pump 30 in a manner to reduce the pump pressure as the motor rotation speed is increased, as indicated by a graph G3. This is because, since the wedge effect and the restriction effect become more significant with the increase in the motor rotation speed, the low static pressure to be supplied from the pump 30 is sufficient enough to operate the slide bearing 3 as the gas-lubricated bearing. From such a perspective, the graph G3 is defined by the pump pressure that is required to operate the slide bearing 3 as the gas-lubricated bearing and that corresponds to the motor rotation speed. When the pump pressure is reduced as the motor rotation speed is increased, just as described, it is possible to reduce the electricity consumption by the pump 30 in the middle-speed range R13 and thus to improve the electric efficiency.

The disclosure is not limited to the control for reducing the pump pressure as the motor rotation speed is increased when the motor rotation speed is equal to or higher than the first speed V1 and lower than the second speed V2. In another example, the pump pressure may be constant regardless of the motor rotation speed.

Next, a description will be made on a method for setting the above-described first speed V1 on the basis of the pump pressure with reference to FIG. 6. In FIG. 6, a horizontal axis represents the motor rotation speed, and a vertical axis represents the pump pressure. In the first embodiment, since the pump pressure that is detected by the pump pressure sensor 68 is equal to or higher than the predetermined pressure Plim, the controller 50 determines that the pump 30 is normal. However, in the case where this pump pressure is lower than a normal pressure, the controller 50 changes the first speed V1 according to this pump pressure. More specifically, in the case where the pump pressure (for example, the maximum pump pressure) that is detected by the pump pressure sensor 68 is lower than a pump pressure Pmax that is usually generated to the pump 30 at the first speed V1, the controller 50 changes the first speed V1 on the basis of the above-described graph G3. In other words, the controller 50 obtains the motor rotation speed, which corresponds to the pump pressure detected by the pump pressure sensor 68, from the graph G3, which defines the pump pressure required to operate the slide bearing 3 as the gas-lubricated bearing and corresponding to the motor rotation speed. Then, the controller 50 sets this motor rotation speed as the newly used first speed V1. In this way, even in the case where the pump pressure is reduced, it is possible to realize the gas-lubricated bearing by this slide bearing 3 when the rolling bearing 4 is switched to the slide bearing 3 on the basis of the first speed V1 that corresponds to such a pump pressure.

Figure 6:
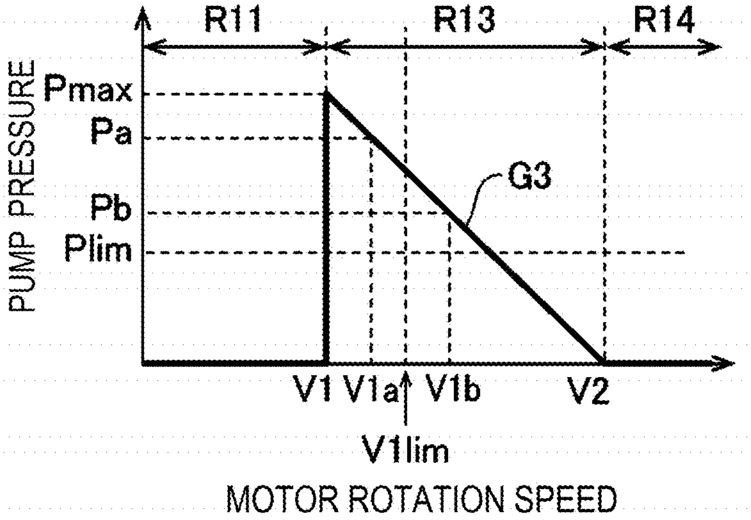
FIG. 6 is a graph for a method for setting a first speed according to the first embodiment of the disclosure.
Figure 7:
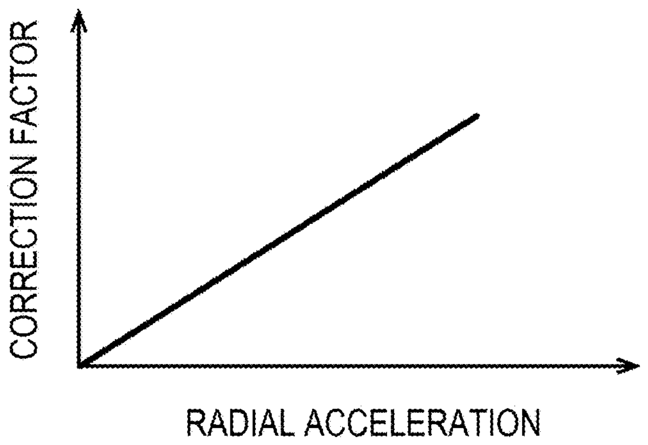
FIG. 7 is a graph for a method for correcting the first speed according to the first embodiment of the disclosure.

In the example illustrated in FIG. 6, in the case where the pump pressure (for example, the maximum pump pressure) that is detected by the pump pressure sensor 68 is "Pa" (Plim<Pa<Pmax), the controller 50 sets "V1*a*", which corresponds to this pump pressure Pa, as the first speed. In addition, in the case where the pump pressure (for example, the maximum pump pressure) that is detected by the pump pressure sensor 68 is "Pb" (Plim<Pb<Pa), the controller 50 sets "V1*b*", which corresponds to this pump pressure Pb, as the first speed. Here, this first speed V1*b* is equal to or higher than a predetermined speed V1lim of the motor rotation speed. This predetermined speed V1lim is defined by such a motor rotation speed that causes the deformation of the rolling element 7, the significant increase in the resistance, and the like in the rolling bearing 4 when the rolling bearing 4 is applied as the bearing that functions to support the rotary shaft 2. Basically, the predetermined speed V1lim is higher than the above-described predetermined speed Vlim for restricting the motor rotation speed at the time when the pump 30 is abnormal.

As described above, in the case where the first speed V1*b* is equal to or higher than the predetermined speed V1lim, the controller 50 does not switch the bearing that functions to support the rotary shaft 2 of the motor 1 from the rolling bearing 4 to the slide bearing 3 and continues to apply the rolling bearing 4 even when the pump pressure is equal to or higher than the predetermined pressure Plim. This suppresses the deformation of the rolling element 7, the significant increase in the resistance, and the like in the rolling bearing 4 that occur when the motor rotation speed becomes equal to or higher than the predetermined speed V1lim at a stage prior to switching of the bearing that functions to support the rotary shaft 2 from the rolling bearing 4 to the slide bearing 3. In the case where the first speed V1*b* is equal to or higher than the predetermined speed V1lim as described above, similar to the case where the pump pressure is lower than the predetermined pressure Plim, the motor rotation speed may be restricted to be lower than the predetermined speed Vlim.

Next, a description will be made on a method for correcting the first speed V1 on the basis of radial acceleration that is exerted on the rotary shaft 2 of the motor 1 with reference to FIG. 7. In FIG. 7, a horizontal axis represents the radial acceleration that is exerted on the rotary shaft 2, and a vertical axis represents a correction factor that is used to correct the first speed V1. This radial acceleration is also exerted on the slide bearing 3 and the rolling bearing 4. In addition, the radial acceleration uniquely corresponds to the radial load. Thus, the radial load may directly be used instead of the radial acceleration. In such a case, the radial acceleration may be converted to the radial load from vehicle weight or the like (hereinafter the same).

The radial acceleration is increased during travel on a rough road, during travel over a bump, when the steering angle is large, when power hop occurs, or the like, for example. In such a high state of the radial acceleration, it is difficult to secure the gas layer between the slide bearing 3 and the rotary shaft 2. Accordingly, the slide bearing 3 that is operated as the gas-lubricated bearing possibly contacts the rotary shaft 2. Thus, in the first embodiment, the first speed V1, which is a threshold value of the motor rotation speed for switching the bearing that functions to support the rotary shaft 2 from the rolling bearing 4 to the slide bearing 3, is corrected to be increased as the radial acceleration is increased. In order to achieve this, as illustrated in FIG. 7, the controller 50 makes a correction to increase the first speed V1 (including the first speed V1 that is set on the basis of the pump pressure as illustrated in FIG. 6) by using the correction factor set such that a value thereof is increased as the radial acceleration is increased. In this way, when the radial acceleration is high, it is possible to avoid the contact risk of the slide bearing 3 with the rotary shaft 2 and thus to ensure safety and reliability.

In addition, in the first embodiment, the controller 50 predicts the radial acceleration that is used to correct the first speed V1 as described above. This is because, even when the bearing control is executed on the basis of the currently generated radial acceleration (for example, can be calculated from the radial load detected by the bearing load sensor 69), the safety and the reliability cannot sufficiently be ensured. In other words, this is because the precise bearing control cannot be executed in a timely manner in the case where the currently generated radial acceleration is used. In particular, this is because the radial acceleration tends to be increased rapidly rather than being gradually increased. Thus, in the first embodiment, the controller 50 predicts radial acceleration that is generated in the future, and executes the bearing control on the basis of this radial acceleration.

For example, the controller 50 predicts the radial acceleration on the basis of a condition of a road surface on which the vehicle travels. In this example, the controller 50 first obtains road surface information indicating the condition of the road surface on which the vehicle travels on the basis of the image of the surroundings of the vehicle captured by the vehicle camera 70, the location and the speed of the target object that exists around the vehicle measured by the radar 71, the map data stored in the navigation system 74, the signal obtained by the communicator 72 through the inter-vehicle communication or the road-to-vehicle communication, or the like. For example, the controller 50 obtains, as the road surface information, information on a curve, the rough road, the bump, and the like that exist in the course. In this case, the controller 50 can acknowledge vibration of the own vehicle caused by the rough road through the inter-vehicle communication by the communicator 72. Then, from such road surface information and the vehicle speed, the controller 50 predicts the radial acceleration to be exerted on the rotary shaft 2 in the future. For example, in the case where the road surface condition is that of the rough road, the controller 50 predicts the radial acceleration with a high value that corresponds to a degree of roughness of the road.

Figure 8:
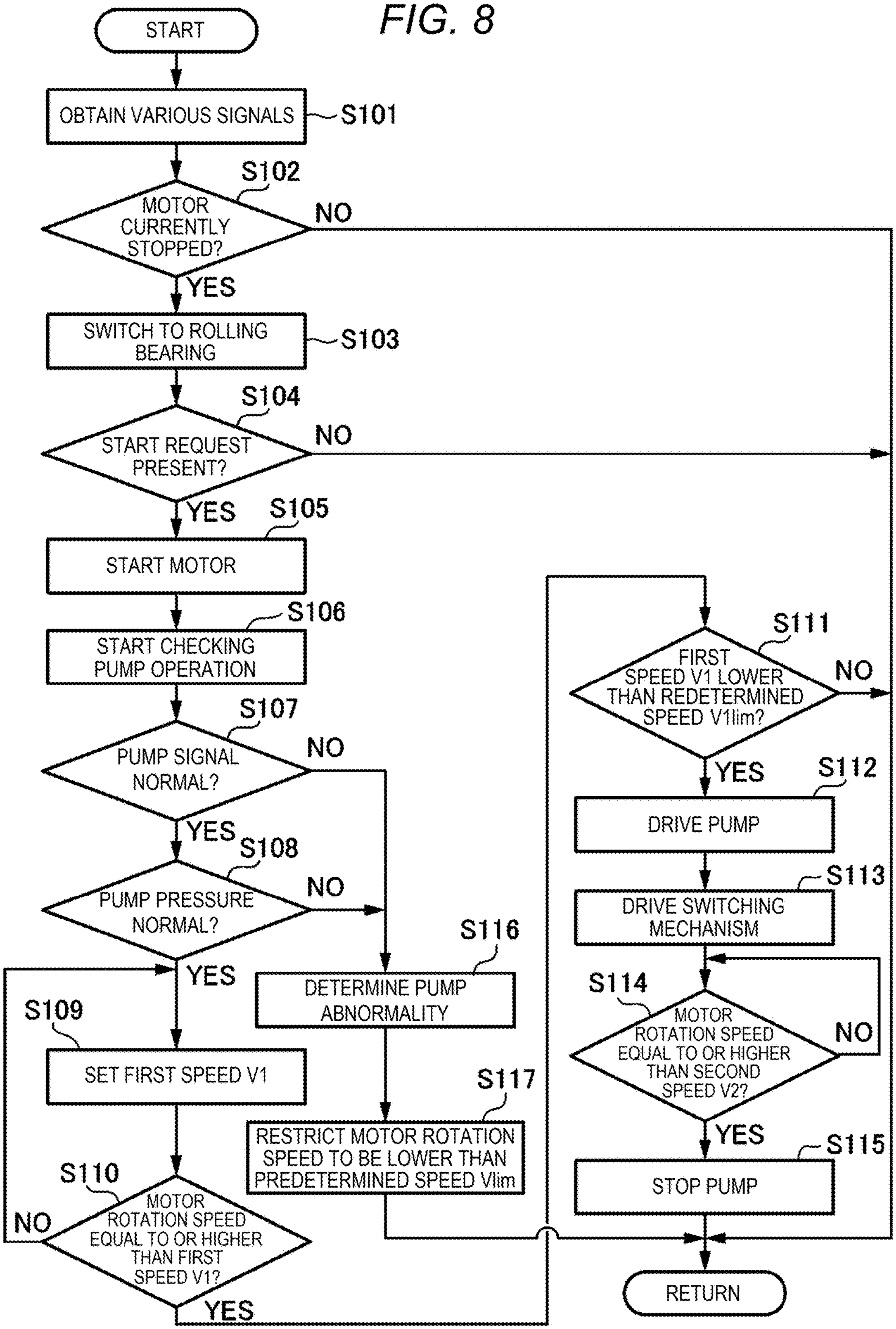
FIG. 8 is a flowchart illustrating the motor bearing control according to the first embodiment of the disclosure.

Next, a description will be made on a specific flow of the motor bearing control according to the first embodiment with reference to FIG. 8. FIG. 8 is a flowchart illustrating the motor bearing control according to the first embodiment. This flow is repeatedly executed by the controller 50 in a predetermined cycle. In more detail, the processor 50*a* in the controller 50 reads the program stored in the memory 50*b* to execute the program, and thereby realizes the motor bearing control for this flow.

First, in step S101, the controller 50 obtains the various signals from the various sensors 61 to 74 illustrated in FIG. 2. Then, in step S102, the controller 50 determines whether the motor 1 is stopped. For example, the controller 50 determines whether the motor 1 is stopped on the basis of the motor rotation speed that corresponds to the signal supplied from the motor rotation speed sensor 66. As a result, if the controller 50 determines that the motor 1 is stopped (step S102: Yes), the processing proceeds to step S103. On the other hand, if not determining that the motor 1 is stopped (step S102: No), the controller 50 terminates the motor bearing control.

Next, in step S103, the controller 50 sets the switching drive unit 15 of the switching mechanism 20 so as to apply the rolling bearing 4 as the bearing that functions to support the rotary shaft 2 of the motor 1. For example, in the state where the slide bearing 3 functions to support the rotary shaft 2, the controller 50 controls the switching drive unit 15 so as to switch the bearing that functions to support the rotary shaft 2 from the slide bearing 3 to the rolling bearing 4.

Next, in step S104, the controller 50 determines whether a vehicle start request is present. For example, the controller 50 determines whether the start request is present on the basis of the accelerator opening angle that corresponds to the signal supplied from the accelerator opening angle sensor 63. As a result, if the controller 50 determines that the start request is present (step S104: Yes), the processing proceeds to step S105, and the motor 1 is started. On the other hand, if not determining that the start request is present (step S104: No), the controller 50 terminates the motor bearing control.

Next, in step S106, in order to determine whether the pump 30 is normal or abnormal, the controller 50 actuates the pump 30 to start checking the operation of the pump 30. Then, in step S107, the controller 50 obtains a signal (a pump signal) that is output from the pump 30 when the pump 30 is actuated just as described, and determines whether this pump signal is normal. For example, the controller 50 determines whether a voltage value or a current value that corresponds to the pump signal is equal to or higher than the predetermined value. As a result, if the controller 50 determines that the pump signal is normal (step S107: Yes), the processing proceeds to step S108. In step S108, the controller 50 determines whether the pump pressure detected by the pump pressure sensor 68 is normal. In this case, the controller 50 determines whether the pump pressure is equal to or higher than the predetermined pressure Plim. For example, the controller 50 makes this determination by using the maximum pump pressure. As a result, if the controller 50 determines that the pump pressure is normal (step S108: Yes), the processing proceeds to step S109.

On the other hand, if the controller 50 does not determine that the pump signal is normal (step S107: No), or if the controller 50 does not determine that the pump pressure is normal (step S108: No), the processing proceeds to step S116. In step S116, the controller 50 determines that the pump 30 is abnormal. In this case, the controller 50 does not switch the bearing that functions to support the rotary shaft 2 of the motor 1 from the rolling bearing 4 to the slide bearing 3, and continues to apply the rolling bearing 4. Then, in step S117, the controller 50 controls the motor 1 to restrict the motor rotation speed to be lower than the predetermined speed Vlim. Thereafter, the controller 50 terminates the motor bearing control.

Next, in step S109, the controller 50 sets the first speed V1 that is the threshold value of the motor rotation speed for switching from the rolling bearing 4 to the slide bearing 3. Typically, in the case where the pump pressure (for example, the maximum pump pressure) detected by the pump pressure sensor 68 is equal to or higher than the pump pressure Pmax that is normally generated by the pump 30 when the motor rotation speed is the first speed V1, the controller 50 sets this first speed V1 as is. In the case where the pump pressure is lower than the pump pressure Pmax, the controller 50 changes the first speed V1 on the basis of the above-described graph G3 (FIG. 6). In the latter case, the controller 50 obtains the motor rotation speed that corresponds to the pump pressure detected by the pump pressure sensor 68 from the graph G3 that defines the pump pressure required to operate the slide bearing 3 as the gas-lubricated bearing and corresponding to the motor rotation speed, and sets this motor rotation speed as the newly used first speed V1. In addition, the controller 50 corrects the thus-set first speed V1 on the basis of the radial acceleration that is exerted on the rotary shaft 2 of the motor 1. More specifically, the controller 50 predicts the radial acceleration exerted on the rotary shaft 2, and corrects the first speed V1 by the correction factor (FIG. 7) that corresponds to this radial acceleration. For example, the controller 50 predicts the radial acceleration to be exerted on the rotary shaft 2 from now on the basis of the condition of the road surface on which the vehicle travels (a degree of roughness of the road), the bump on the road surface on which the vehicle travels (in detail, the power hop of the vehicle due to the bump), the steering angle of the vehicle, and the like.

Next, in step S110, the controller 50 determines whether the motor rotation speed detected by the motor rotation speed sensor 66 is equal to or higher than the first speed V1 set in step S109, that is, whether the motor rotation speed is in the middle-speed range R13. As a result, if the controller 50 determines that the motor rotation speed is equal to or higher than the first speed V1 (step S110: Yes), the processing proceeds to step S111. On the other hand, if the controller 50 does not determine that the motor rotation speed is equal to or higher than the first speed V1 (step S110: No), the processing returns to step S109.

Next, in step S111, the controller 50 determines whether the first speed V1 set in step S109 is lower than the predetermined speed V1lim. As a result, if the controller 50 determines that the first speed V1 is lower than the predetermined speed V1lim (step S111: Yes), the processing proceeds to step S112. On the other hand, if the controller 50 does not determine that the first speed V1 is lower than the predetermined speed V1lim (step S111: No), the motor bearing control is terminated. In the latter case, the first speed V1 is equal to or higher than the predetermined speed V1lim, the controller 50 does not switch the bearing that functions to support the rotary shaft 2 of the motor 1 from the rolling bearing 4 to the slide bearing 3, and continues to apply the rolling bearing 4.

Next, in step S112, in order to operate the slide bearing 3 as the gas-lubricated bearing, the controller 50 controls the pump 30 to form the gas layer between the rotary shaft 2 and the slide bearing 3 by the gas from the pump 30. Then, in step S113, the controller 50 controls the switching drive unit 15 of the switching mechanism 20 so as to switch the bearing that functions to support the rotary shaft 2 from the rolling bearing 4 to the slide bearing 3.

Next, in step S114, the controller 50 determines whether the motor rotation speed detected by the motor rotation speed sensor 66 is equal to or higher than the second speed V2, that is, whether the motor rotation speed is in the high-speed range R14. As a result, if the controller 50 determines that the motor rotation speed is equal to or higher than the second speed V2 (step S114: Yes), the processing proceeds to step S115. In this case, since the gas-lubricated bearing can be realized without actuating the pump 30, the controller 50 stops the pump 30 (step S115). Then, the controller 50 terminates the motor bearing control. On the other hand, if the controller 50 does not determine that the motor rotation speed is equal to or higher than the second speed V2 (step S114: No), the processing returns to step S114.

As a condition for stopping the pump 30 as described above, a condition that a straight road continues in the travel road of the vehicle (for example, such a condition is satisfied during travel on a controlled-access highway) and/or a condition that a flat road surface continues in the travel road of the vehicle may further be used. The controller 50 can determine any of such conditions from the image of the surroundings of the vehicle captured by the vehicle camera 70, the map data stored in the navigation system 74, or the like, for example.

In the first embodiment that has been described so far, the controller 50 (1) sets the switching mechanism 20 into the first state where the rolling bearing 4 functions as the bearing that supports the rotary shaft 2 when the motor rotation speed is lower than the first speed V1, (2) sets the switching mechanism 20 into the second state where the slide bearing 3 functions as the bearing that supports the rotary shaft 2, and controls the pump 30 to operate the slide bearing 3 as the gas-lubricated bearing when the controller 50 determines that the pump 30 is normal, and when the motor rotation speed is equal to or higher than the first speed V1, and (3) sets the switching mechanism 20 into the first state and controls the motor 1 to restrict the motor rotation speed to be lower than the predetermined speed Vlim even when the motor rotation speed is equal to or higher than the first speed V1 in the case where it is determined that the pump 30 is abnormal.

In the first embodiment described above, when the motor rotation speed is lower than the first speed V1, that is, in the low-speed range R11 where the wedge effect and the restriction effect are hardly exerted, the electricity consumption by the pump 30 that is required to operate the slide bearing 3 as the gas-lubricated bearing is extremely large. Thus, the controller 50 does not apply the slide bearing 3 but applies the rolling bearing 4 as the bearing that functions to support the rotary shaft 2. In this way, it is possible to suppress worsening of the electric efficiency, which is caused by actuating the pump to realize the gas-lubricated bearing.

In the first embodiment, when the motor rotation speed is equal to or higher than the first speed V1, the wedge effect and the restriction effect can be exerted. Accordingly, the electricity consumption by the pump 30 that is required to operate the slide bearing 3 as the gas-lubricated bearing is relatively small. Thus, the controller 50 applies the slide bearing 3 as the bearing that functions to support the rotary shaft 2. In this case, the electric efficiency improvement allowance, which is obtained by applying the slide bearing 3 as the gas-lubricated bearing, becomes larger than the electric efficiency reduction allowance, which is obtained by actuating the pump to realize the gas-lubricated bearing. Thus, it is possible to ensure an electric efficiency improvement effect, which is exerted by applying the gas-lubricated bearing.

In the first embodiment, in the case where the pump 30 is abnormal, the controller 50 applies the rolling bearing 4 as the bearing that functions to support the rotary shaft 2 even when the motor rotation speed is equal to or higher than the first speed V1. Accordingly, in the case where the slide bearing 3 is applied to be operated as the gas-lubricated bearing, it is possible to avoid the contact risk of the slide bearing 3 with the rotary shaft 2. In addition, the controller 50 restricts the motor rotation speed when the pump 30 is abnormal. Thus, it is possible to suppress the occurrence of the deformation of the rolling element 7, the significant increase in the resistance, and the like in the rolling bearing 4, which is caused by driving the motor 1 at the high rotation speed.

In the first embodiment, the controller 50 sets the first speed V1 on the basis of the motor rotation speed at which the required pump pressure to operate the slide bearing 3 as the gas-lubricated bearing can be obtained. In this way, even in the case where the pump pressure is reduced, it is possible to precisely realize the gas-lubricated bearing by this slide bearing 3 when the rolling bearing 4 is switched to the slide bearing 3 by using the first speed V1 that corresponds to such a pump pressure.

In the first embodiment, in the case where the set first speed V1 is equal to or higher than the predetermined speed V1lim, the controller 50 does not switch the bearing that functions to support the rotary shaft 2 of the motor 1 from the rolling bearing 4 to the slide bearing 3 and continues to apply the rolling bearing 4 even when the motor rotation speed is equal to or higher than the first speed V1. In this way, it is possible to suppress the deformation of the rolling element 7, the significant increase in the resistance, and the like in the rolling bearing 4, which occur when the motor rotation speed becomes equal to or higher than the predetermined speed V1lim at the stage prior to switching of the bearing that functions to support the rotary shaft 2 from the rolling bearing 4 to the slide bearing 3.

In the first embodiment, the controller 50 sets the first speed V1 on the basis of the radial acceleration that is exerted on the rotary shaft 2 of the motor 1. Thus, when the radial acceleration is high, the contact risk of the slide bearing 3 with the rotary shaft 2 can be avoided to ensure the safety and the reliability.

A description will herein be made on a modified example of the above-described embodiment. The modified example is also applied to an embodiment, which will be described below.

In the above-described embodiment, the pump 30 is stopped when the motor rotation speed is lower than the first speed V1. In the modified example, the pump 30 may be actuated to a certain extent. However, when the motor rotation speed is lower than the first speed V1, the controller 50 reduces a driving force of the pump 30 to be smaller than that at the time when the motor rotation speed is equal to or higher than the first speed V1 and is lower than the second speed V2.

In the above-described embodiment, the motor bearing control is executed on the basis of the motor rotation speed. However, in the modified example, the motor bearing control may be executed on the basis of the motor rotational frequency. This is because the motor rotational frequency uniquely corresponds to the motor rotation speed.

Figure 9:
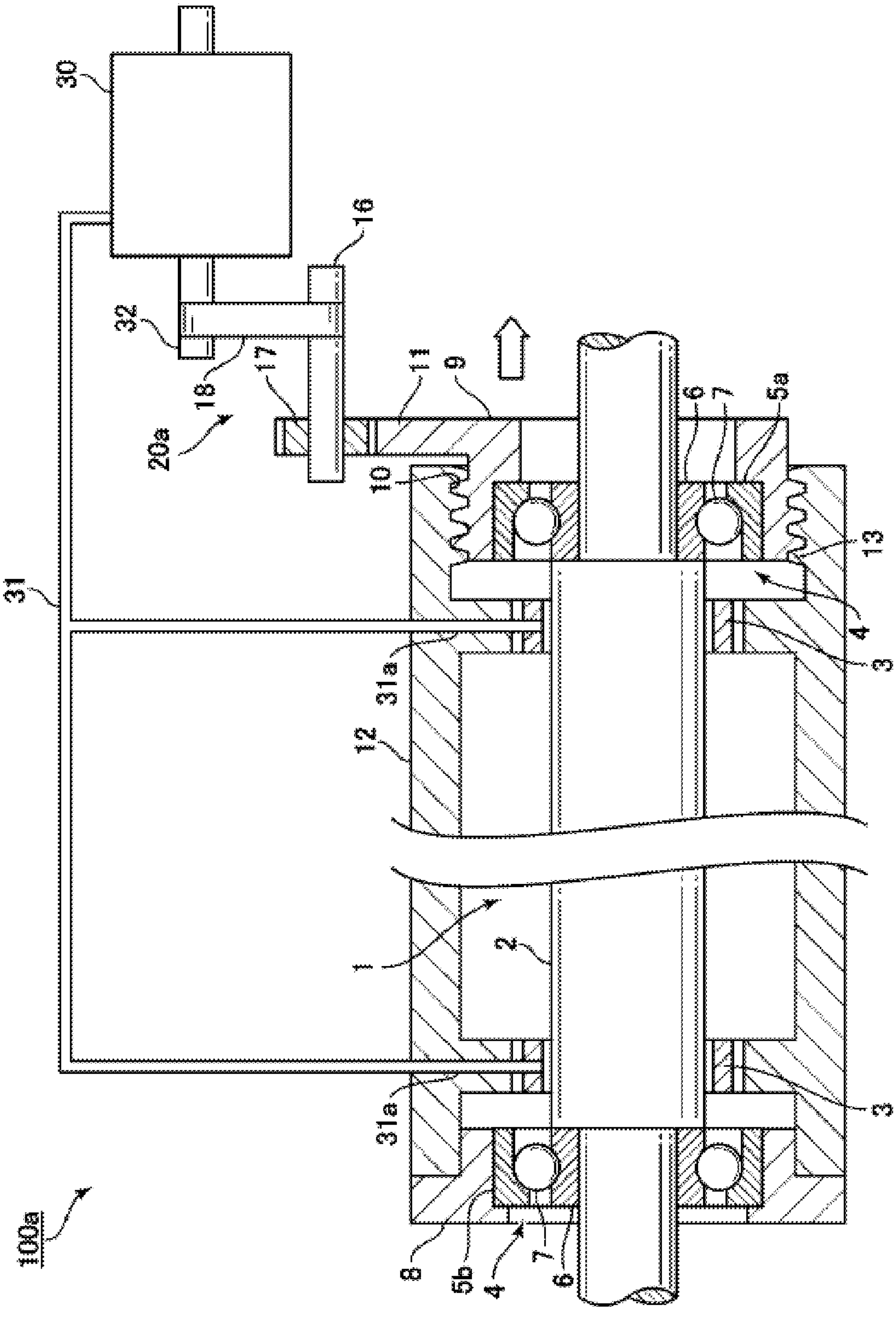
FIG. 9 is a schematic configuration view of a motor bearing system according to a modified example of the first embodiment of the disclosure.

In the above-described embodiment, the controller 50 drives the switching mechanism 20 by controlling the switching drive unit 15, in other words, the controller 50 directly controls the switching mechanism 20 (FIGS. 1 and 2). However, the disclosure is not limited to such an embodiment. FIG. 9 is a schematic configuration view of a motor bearing system according to the modified example of the first embodiment. In a motor bearing system 100*a* according to this modified example, the switching mechanism 20*a* is driven not by the switching drive unit 15 as in the above-described embodiment but by the pump 30. More specifically, in the switching mechanism 20*a*, the drive shaft 16 of the drive gear 17 that meshes with the fan-shaped gear 11 of the outer ring movable member 9 is not driven by the switching drive unit 15 as in the above-described embodiment but by the pump 30. Further in detail, the drive shaft 16 of the switching mechanism 20*a* and a rotary 2 of the pump 30 are connected via a predetermined transmission member 18 such as a belt, a chain, or a gear. In this way, rotation of the rotary shaft 32 of the pump 30 is transmitted to the drive shaft 16 of the switching mechanism 20*a*. Thus, when the pump 30 is actuated, the switching mechanism 20*a* is driven. In such a modified example, the controller 50 indirectly controls the switching mechanism 20*a* via the pump 30 instead of directly controlling the switching mechanism 20*a*.

Second Embodiment

Next, a description will be made on a second embodiment of the disclosure. In the first embodiment, the bearing that functions to support the rotary shaft 2 of the motor 1 is switched between the rolling bearing 4 and the slide bearing 3 that is operable as the gas-lubricated bearing by the gas supplied from the pump 30. In contrast, the second embodiment differs from the first embodiment in a point that, instead of using the two bearings of the rolling bearing 4 and the slide bearing 3, only one rolling bearing is used to supply the gas from the pump 30 to this rolling bearing, and the rolling bearing is thereby operated as the gas-lubricated bearing that achieves the gaseous lubrication. Thus, in the second embodiment, the switching mechanisms 20, 20*a* as described in the first embodiment are not provided.

Here, a description on the same configuration as that in the first embodiment will not be made, and a description will only be made on different configuration and control from those in the first embodiment. In particular, in the second embodiment, only the configuration of the motor bearing system differs from that in the first embodiment, and the motor bearing control is the same as that in the first embodiment.

Figure 10:
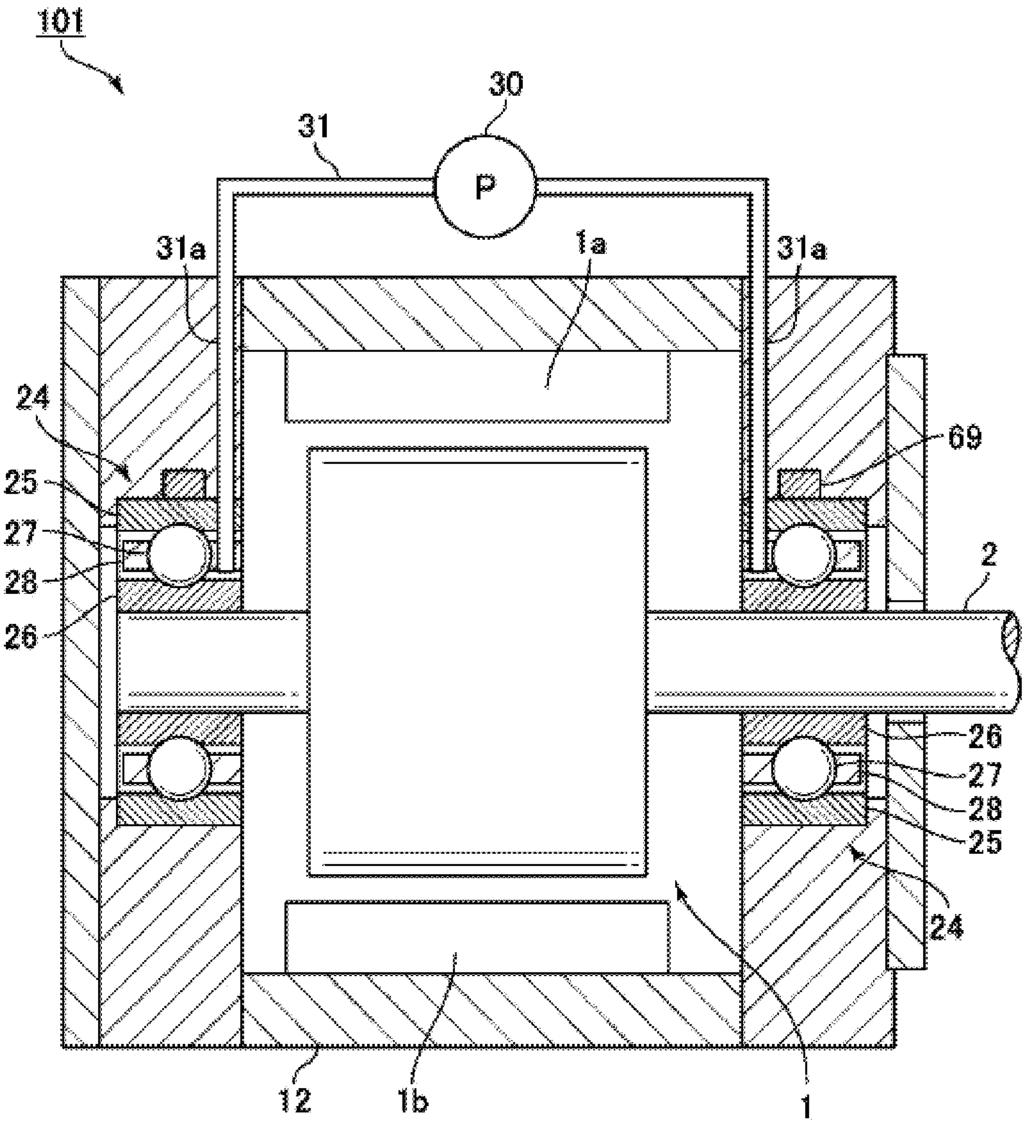
FIG. 10 is a schematic configuration view of a motor bearing system according to a second embodiment of the disclosure.

FIG. 10 is a schematic configuration view of a motor bearing system according to the second embodiment. As illustrated in FIG. 10, a motor bearing system 101 according to the second embodiment has: the motor 1 that includes a rotor 1*a* and a stator 1*b*; the rotary shaft 2 of the motor 1; a pair of rolling bearings 24 that supports the rotary shaft 2; and the housing 12 that accommodates these motor 1, rotary shaft 2, and rolling bearings 24. Each of the rolling bearings 24 has: an outer ring 25 that is fixed to the housing 12; an inner ring 26 that is attached to the rotary shaft 2 of the motor; plural rolling elements (balls and rollers) 27 that are interposed between these outer ring 25 and inner ring 26; and a holding section 28 that holds the plural rolling elements 27. On an outer side of the outer ring 25 in the rolling bearing 24, the bearing load sensor 69 is provided to detect the load (the radial load) that is radially applied to the rolling bearing 24.

The motor bearing system 101 further has the pump 30 that supplies the gas (typically the air but may be the oil gas or the refrigerant) to the rolling bearing 24 in order to form the gas layer between the rotary shaft 2 and the rolling bearing 24 and thereby achieve the gaseous lubrication of the rolling bearing 24, that is, to cause the rolling bearing 24 to operate as the gas-lubricated bearing. More specifically, the pump 30 supplies the gas through the gas supply passage 31 to a portion (the radial clearance that is defined in the radial direction of the rotary shaft 2) between the inner ring 26 in each of the paired rolling bearings 24 and the holding section 28 holding the rolling element 27. In this gas supply passage 31, the downstream portion 31*a* thereof is formed in the housing 12, the outer ring 25 of the rolling bearing 24, and the holding section 28.

Figure 11:
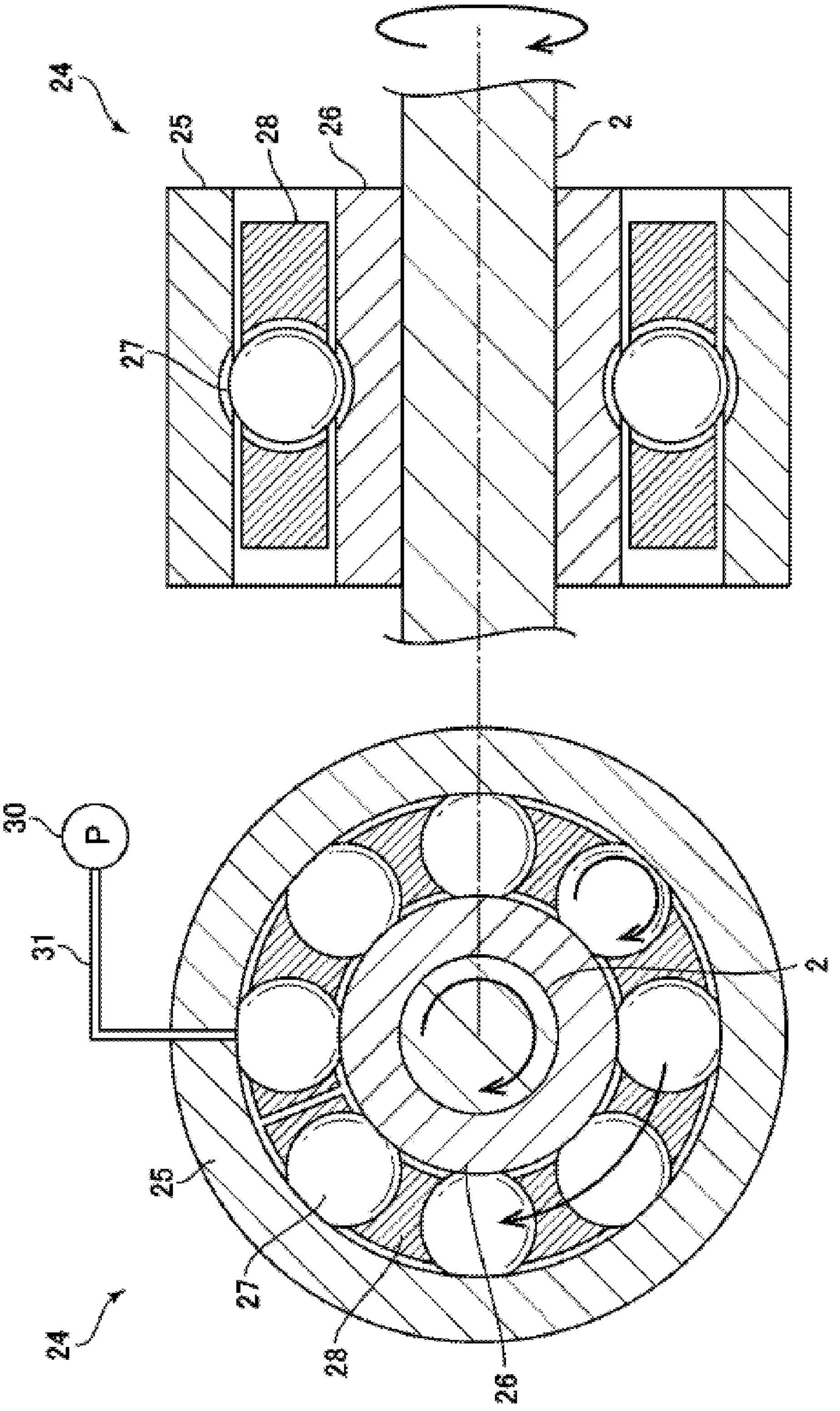
FIG. 11 includes cross-sectional views illustrating a state of a rolling bearing at the time when a pump is not actuated in the motor bearing system according to the second embodiment of the disclosure.

FIG. 11 illustrates a state of the rolling bearing 24 at the time when the pump 30 is not actuated in the motor bearing system 101. FIG. 11 illustrates a transverse cross section of the rotary shaft 2 and the rolling bearing 24 on a left side, and illustrates a vertical cross section of the rotary shaft 2 and the rolling bearing 24 that is orthogonal to this transverse cross section on a right side. As illustrated in FIG. 11, when the pump 30 is not actuated, the rolling element 27 in the rolling bearing 24 is in contact with the outer ring 25 and the inner ring 26, and the rolling bearing 24 literally functions as the rolling bearing.

Figure 12:
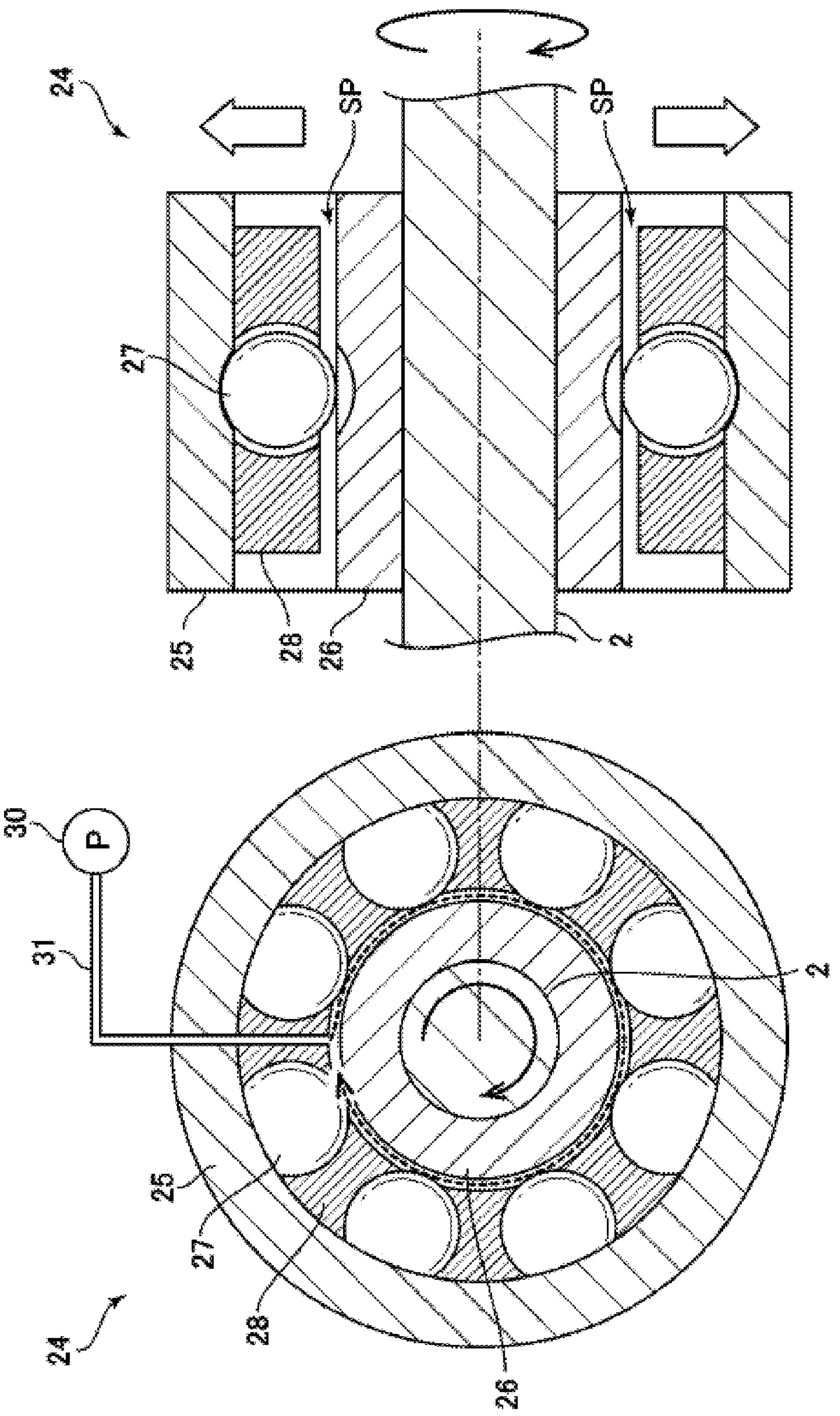
FIG. 12 includes cross-sectional views illustrating the state of the rolling bearing at the time when the pump is actuated in the motor bearing system according to the second embodiment of the disclosure.

FIG. 12 illustrates the state of the rolling bearing 24 at the time when the pump 30 is actuated in the motor bearing system 101. FIG. 12 illustrates a transverse cross section of the rotary shaft 2 and the rolling bearing 24 on a left side, and illustrates a vertical cross section of the rotary shaft 2 and the rolling bearing 24 that is orthogonal to this transverse cross section on a right side. When the pump 30 is actuated, in the rolling bearing 24, the gas layer is formed in a clearance SP between the inner ring 26 and the holding section 28, which holds the rolling element 27, by the gas supplied from the pump 30, and the holding section 28 and the rolling element 27 float from the inner ring 26. At this time, the holding section 28 is fixed to the outer ring 25 by a locking member (a claw or the like) so as not to rotate. In such a state, since the rolling element 27 that is held by the holding section 28 does not contact the inner ring 26, the rolling bearing 24 no longer functions as the rolling bearing. Instead, the rolling bearing 24 functions as the gas-lubricated bearing that achieves the gaseous lubrication by the gas supplied from the pump 30. As described in the first embodiment, in the high-speed range R14 where the sliding speed is extremely high, such a gas-lubricated bearing is realized (thus the pump 30 is stopped) even when the static pressure is not applied by the pump 30.

According to the second embodiment that has been described so far, the single rolling bearing 24 is selectively operated as the rolling bearing or the gas-lubricated bearing. Thus, the similar motor bearing control to that in the first embodiment can be executed with the simple configuration.

REFERENCE SIGNS LIST

1: motor
2: rotary shaft
3: slide bearing
4: rolling bearing
5*a*, 5*b*: outer ring
6: inner ring
7: rolling element
12: housing
15: switching drive unit
20: switching mechanism
24: rolling bearing
25: outer ring
26: inner ring
27: rolling element
28: holding section
30: pump
31: gas supply passage
50: controller
66: motor rotation speed sensor
100, 100*a*, 101: motor bearing system

The invention claimed is:

1. A motor bearing system comprising:
a rolling bearing that supports a rotary shaft of a motor;
a slide bearing that is arranged in parallel with the rolling bearing on an axis of the rotary shaft to support the rotary shaft, the slide bearing being operable as a gas-lubricated bearing that achieves gaseous lubrication with gas supplied to the slide bearing;
a pump that supplies the gas to the slide bearing;
a switching structure to set one of a first state where the rolling bearing functions as a bearing that supports the rotary shaft and a second state where the slide bearing functions as the bearing that supports the rotary shaft;
a detector configured to detect a rotation speed of the motor; and
controller circuitry that is configured to control the pump and the switching structure on a basis of the rotation speed detected by the detector and determine whether the pump is normal or abnormal, wherein
the controller circuitry is configured to
set the switching structure into the first state when the rotation speed is lower than a threshold value,
set the switching structure into the second state and controls the pump, so as to operate the slide bearing as the gas-lubricated bearing when the controller circuitry determines that the pump is normal and when the rotation speed is equal to or higher than the threshold value, and set the switching structure into the first state and control the motor to restrict the rotation speed of the motor to be lower than a predetermined speed even when the rotation speed is equal to or higher than the threshold value in a case where the controller circuitry determines that the pump is abnormal, wherein the rolling bearing has an outer ring, an inner ring, and a rolling element provided therebetween, and in order to switch between the first state and the second state, the switching structure can move a part of the rolling bearing, so as to switch between a state where (i) the outer ring and the inner ring and (ii) the rolling element are in contact with each other in the rolling bearing and a state where the outer ring or the inner ring is not in contact with the rolling element in the rolling bearing.

2. The motor bearing system according to claim 1, wherein the controller circuitry is configured to set the threshold value on a basis of a radial load that is applied to the rotary shaft.

3. The motor bearing system according to claim 1, wherein the controller circuitry is configured to set the threshold value on a basis of the rotation speed of the motor at which a required pressure of the pump to operate the slide bearing as the gas-lubricated bearing can be obtained.

4. The motor bearing system according to claim 3, wherein the controller circuitry is configured to set the threshold value on a basis of a radial load that is applied to the rotary shaft.

5. The motor bearing system according to claim 3, wherein in a case where the set threshold value is equal to or higher than the predetermined speed, the controller circuitry is configured to set the switching structure into the first state even when the rotation speed is equal to or higher than the threshold value.

6. The motor bearing system according to claim 5, wherein the controller circuitry is configured to set the threshold value on a basis of a radial load that is applied to the rotary shaft.

7. A motor bearing system comprising:

a bearing that includes plural rolling elements and supports a rotary shaft of a motor, the bearing being operated as a rolling bearing or being operated as a gas-lubricated bearing that achieves gaseous lubrication with gas supplied to the bearing;

a pump that supplies the gas to the bearing;

a detector configured to detect a rotation speed of the motor; and controller circuitry that is configured to control the pump on a basis of the rotation speed detected by the detector and determine whether the pump is normal or abnormal, wherein the controller circuitry is configured to stop the pump or reduce a driving force of the pump to be smaller than that at a time when the rotation speed is equal to or higher than a threshold value, so as to operate the bearing as the rolling bearing in a case where the rotation speed is lower than the threshold value, control the pump to operate the bearing as the gas-lubricated bearing when the controller circuitry determines that the pump is normal, and when the rotation speed is equal to or higher than the threshold value, and operate the bearing as the rolling bearing and control the motor to restrict the rotation speed of the motor to be lower than a predetermined speed even when the rotation speed is equal to or higher than the threshold value in a case where the controller circuitry determines that the pump is abnormal, wherein the controller circuitry is configured to set the threshold value on a basis of the rotation speed of the motor at which a required pressure of the pump to operate the bearing as the gas-lubricated bearing can be obtained, and wherein in a case where the set threshold value is equal to or higher than the predetermined speed, the controller circuitry is configured to operate the bearing as the rolling bearing even when the rotation speed is equal to or higher than the threshold value.

8. The motor bearing system according to claim 7, wherein the controller circuitry is configured to set the threshold value on a basis of a radial load that is applied to the rotary shaft.

* * * * *